US011912931B2

(12) United States Patent
Azzaroni et al.

(10) Patent No.: US 11,912,931 B2
(45) Date of Patent: Feb. 27, 2024

(54) POLYMERIC SURFACTANTS HAVING INCREASED SALT TOLERANCE AND METHOD OF PREPARATION THEREOF

(71) Applicants: YPF TECNOLOGÍA S.A., Ciudad Autónoma de Buenos Aires (AR); CONSEJO NACIONAL DE INVESTIGACIONES CIENTÍFICAS Y TÉCNICAS (CONICET), Ciudad Autónoma de Buenos Aires (AR)

(72) Inventors: Omar Azzaroni, La Plata Prov. de Buenos Aires (AR); Juan Martín Giussi, La Plata Prov. de Buenos Aires (AR); Agustín Iborra, La Plata Prov. de Buenos Aires (AR); Isabel Vega, Ciudad Autónoma de Buenos Aires (AR)

(73) Assignees: YPF TECNOLOGÍA S.A., Ciudad Autónoma de Buenos Aires (AR); CONSEJO NACIONAL DE INVESTIGACIONES CIENTÍFICAS Y TÉCNICAS (CONICET), Ciudad Autónoma de Buenos Aires (AR)

( * ) Notice: Subject to any disclaimer, the term of this patent is extended or adjusted under 35 U.S.C. 154(b) by 0 days.

(21) Appl. No.: 17/811,275

(22) Filed: Jul. 7, 2022

(65) Prior Publication Data
US 2023/0011836 A1  Jan. 12, 2023

Related U.S. Application Data

(60) Provisional application No. 63/219,168, filed on Jul. 7, 2021.

(51) Int. Cl.
*C08F 220/26*  (2006.01)
*C09K 8/584*  (2006.01)
(Continued)

(52) U.S. Cl.
CPC .......... *C09K 8/584* (2013.01); *C08F 293/005* (2013.01); *C09K 8/588* (2013.01); *C08F 2438/01* (2013.01); *C08F 2438/03* (2013.01)

(58) Field of Classification Search
CPC .............. C08F 2438/01; C08F 2438/03; C08F 293/005; C08F 220/286; C08F 220/382;
(Continued)

(56) References Cited

U.S. PATENT DOCUMENTS

2004/0058073 A1* 3/2004 Bunyard .............. A61K 8/0208
427/337
2006/0130706 A1* 6/2006 Nakajima .............. C09D 11/30
523/160
(Continued)

Primary Examiner — Mark S Kaucher
(74) Attorney, Agent, or Firm — Muncy, Geissler, Olds & Lowe, P.C.

(57) ABSTRACT

A polymeric surfactant for use in chemical enhanced oil recovery, including a terpolymer of a first non-ionic monomer, a second non-ionic monomer, and an ionic monomer, the first non-ionic monomer being a hydrophilic monomer and the second non-ionic monomer being a hydrophobic monomer, the ionic monomer being in a lower proportion than the first and second non-ionic monomers. A method of preparation of polymeric surfactants.

3 Claims, 6 Drawing Sheets

(51) Int. Cl.
*C08F 293/00* (2006.01)
*C09K 8/588* (2006.01)

(58) Field of Classification Search
CPC .................. C08F 212/08; C08F 220/34; C08F 220/1804; C08F 220/1805; C08F 220/1806; C08F 220/1807; C08F 220/1808; C08F 220/1809; C08F 220/1811; C08F 220/1812; C08F 220/1818; C08F 220/04; C08F 220/46; C09K 8/584; C09K 8/588
See application file for complete search history.

(56) References Cited

U.S. PATENT DOCUMENTS

| | | | |
|---|---|---|---|
| 2007/0082196 A1* | 4/2007 | Ali | C09J 7/21 428/354 |
| 2010/0186764 A1* | 7/2010 | Pasquet | A61K 8/85 424/70.13 |
| 2010/0234527 A1* | 9/2010 | Ota | H01L 31/0203 257/E31.117 |
| 2015/0344713 A1* | 12/2015 | Mizushima | C09D 133/14 347/100 |

* cited by examiner

POLYMERIC SURFACTANTS HAVING INCREASED SALT TOLERANCE AND METHOD OF PREPARATION THEREOF

TECHNICAL FIELD

The present invention generally relates to the field of substances for use in oil recovery processes. Specifically, the present invention relates to polymeric surfactants for use in chemical enhanced oil recovery processes and methods of preparation thereof.

BACKGROUND

Surfactants used in enhanced oil recovery (EOR) operations generally display a low stability in highly saline media. The limited number of surfactants having increased stability in highly saline phases have a narrow salt concentration window. Therefore, while it is possible to obtain a surfactant formulation that tolerate high salt concentrations, a small deviation from those concentrations causes the system to quickly destabilize.

In addition, even though low molecular weight surfactants may, in a first stage, allow dispersion of oily phases, i.e. hydrocarbons, in aqueous systems, the system colloidal stability is limited. Further, a considerable amount of surfactant is required in order to modify the interfacial properties of dispersed systems.

The use of amphiphilic copolymers, i.e. polymers comprising hydrophobic units and hydrophilic units, as emulsifiers has shown an increased efficiency compared to low molecular weight surfactants. These polymeric surfactants are commonly referred to as "macrosurfactants", "polysoaps". The difference between macrosurfactants and polysoaps is related to monomers distribution along the linear polymer chain. Macrosurfactants are commonly copolymers with a block microstructure, while polysoaps are commonly copolymers with an alternating or statistical microstructure. Compared to traditional surfactants, polymeric surfactants have lower critical micellar concentrations and smaller diffusion coefficients.

In general, the synthetic methods employed for the preparation of polymeric surfactants generally comprise several steps and require complex experimental techniques, which limits the industrial synthesis of these types of polymers.

There is therefore a need to provide a polymeric surfactant that can tolerate high salinity media in a large salt concentration window and having increased colloidal stability, as well as a simple and easily scalable method of preparation thereof.

SUMMARY

The present invention provides polymeric surfactants, e.g. macrosurfactants and polysoaps having a molecular weight in the range of 20 kDa to 120 kDa. These polymeric surfactants have microstructures that strategically combine non-ionic entities, both hydrophobic and hydrophilic, and ionic entities in a lower proportion. The non-ionic entities, both hydrophobic and hydrophilic confer the surfactant its surface activity and the ionic entities provide stability in a wide range of salt concentrations, as well as in a wide temperature range.

The surfactants of the invention comprise macromolecular compounds prepared using non-ionic monomers, both hydrophobic and hydrophilic, and a number of ionic entities, which act synergistically conferring the surfactant usability in a wide range of saline conditions and high recovery factors in flow essays.

Therefore, a first object provided by the invention is a surfactant comprising a terpolymer of a first non-ionic monomer, a second non-ionic monomer and a ionic monomer, wherein the first non-ionic monomer is a hydrophilic monomer and the second non-ionic monomer is an hydrophobic monomer and the ionic monomer is in a lower proportion than the first and second non-ionic monomers. The terpolymer acts as an amphiphilic actuator.

In preferred embodiments, the first non-ionic monomer, i.e. the hydrophilic monomer, is selected from di(ethylene glycol) methyl ether methacrylate and poly(ethylene glycol) methyl ether methacrylates and mixtures thereof, the poly(ethylene glycol) methyl ether methacrylates preferably having number-average molecular weights (Mn) of about 480 g/mol, about 500 g/mol or about 950 g/mol. Preferably, the molar ratio of first non-ionic monomer to total monomer is between 0.3 and 0.5.

In preferred embodiments, the second non-ionic monomer, i.e. the hydrophobic monomer is selected from dodecyl methacrylate, n-octadecyl methacrylate, butyl methacrylate, t-butyl methacrylate, 2-ethylhexyl methacrylate, 2-(diethylamino) ethyl methacrylate, styrene and mixtures thereof. Preferably, the molar ratio of second non-ionic monomer to total monomer is between 0.4 and 0.8.

In preferred embodiments, the ionic monomer is selected from sodium methacrylate, [2-(methacryloyloxy) ethyl] trimethylammonium chloride, a 3-sulfopropyl methacrylate potassium salt and [2-(methacryloyloxy) ethyl] dimethyl-(3-sulfopropyl) ammonium hydroxide and mixtures thereof. Preferably, the molar ratio of ionic monomer to total monomer is between 0.01 and 0.15.

The polymeric surfactants provided by the present invention comprise several combinations of the aforementioned monomers.

In a preferred embodiment, the first non-ionic monomer is a poly(ethylene glycol) methyl ether methacrylate having a number-average molecular weight (Mn) of about 500 g/mol, the second non-ionic monomer is dodecyl methacrylate and the ionic monomer is 3-sulfopropyl methacrylate potassium salt.

In another preferred embodiment, the first non-ionic monomer is a poly(ethylene glycol) methyl ether methacrylate having a number-average molecular weight (Mn) of about 500 g/mol, the second non-ionic monomer is dodecyl methacrylate and the ionic monomer is sodium [2-(methacryloyloxy) ethyl] trimethylammonium chloride.

In yet another preferred embodiment, the first non-ionic monomer is poly(ethylene glycol) methyl ether methacrylate having a number-average molecular weight (Mn) of about 500 g/mol, the second non-ionic monomer is 2-ethylhexyl methacrylate and the ionic monomer is 3-sulfopropyl methacrylate potassium salt.

In still another preferred embodiment, the first non-ionic monomer is a poly(ethylene glycol) methyl ether methacrylate having a number-average molecular weight (Mn) of about 480 g/mol, the second non-ionic monomer is dodecyl methacrylate and the ionic monomer is sodium [2-(methacryloyloxy) ethyl] trimethylammonium chloride.

In another preferred embodiment, the first non-ionic monomer is a poly(ethylene glycol) methyl ether methacrylate having a number-average molecular weight (Mn) of about 480 g/mol, the second non-ionic monomer is dodecyl methacrylate and the ionic monomer is 3-sulfopropyl methacrylate potassium salt.

In another preferred embodiment, the first non-ionic monomer is a poly(ethylene glycol) methyl ether methacrylate having a number-average molecular weight (Mn) of about 480 g/mol, the second non-ionic monomer is 2-ethylhexyl methacrylate and the ionic monomer is 3-sulfopropyl methacrylate potassium salt.

In yet another preferred embodiment, the first non-ionic monomer is a poly(ethylene glycol) methyl ether methacrylate having a number-average molecular weight (Mn) of about 500 g/mol, the second non-ionic monomer is n-octadecyl methacrylate and the ionic monomer is 3-sulfopropyl methacrylate potassium salt.

In still another preferred embodiment, the first non-ionic monomer is a poly(ethylene glycol) methyl ether methacrylate having a number-average molecular weight (Mn) of about 950 g/mol, the second non-ionic monomer is n-octadecyl methacrylate and the ionic monomer is 3-sulfopropyl methacrylate potassium salt.

DETAILED DESCRIPTION

The surfactants provided by the present invention can be obtained using conventional polymer synthesis methods, such as methods adapted for Atom Transfer Radical Polymerization (ATRP), Reversible Addition-Fragmentation chain Transfer (RAFT) polymerization and Free Radical Polymerization. The polymerization mixture was prepared in a Schlenk flask dissolving non-ionic monomers, both hydrophobic, hydrophilic and ionic and purged by bubbling $N_2$ for 50 minutes. Afterwards, the initiator and the CTA (RAFT) or complex (ATRP) were dissolved into the mixture. Polymerization temperatures were kept between 25 and 90° C., under atmospheric pressure, and after 5-10 h, the reaction mixture was dissolved. The crude polymer was purified firstly by precipitation in n-hexane, and secondly, the precipitate was dissolved in water, and the dissolution was dialyzed and freeze-dried. The order in which the monomers are added depends on the surfactant to be obtained.

The molar fraction of hydrophilic monomer in the monomer mixture can be obtained from equation (1):

$$F_{Hydrophilic} = \frac{\text{mmol Hydrophilic monomer}}{\text{mmol Hydrophilic monomer} + \text{mmol Hydrophobic monomer} + \text{mmol Ionic monomer}} \quad (1)$$

The molar fraction of hydrophobic monomer in the monomer mixture can be obtained from equation (2):

$$F_{Hydrophobic} = \frac{\text{mmol Hydrophobic monomer}}{\text{mmol Hydrophilic monomer} + \text{mmol Hydrophobic monomer} + \text{mmol Ionic monomer}} \quad (2)$$

Figure 1:
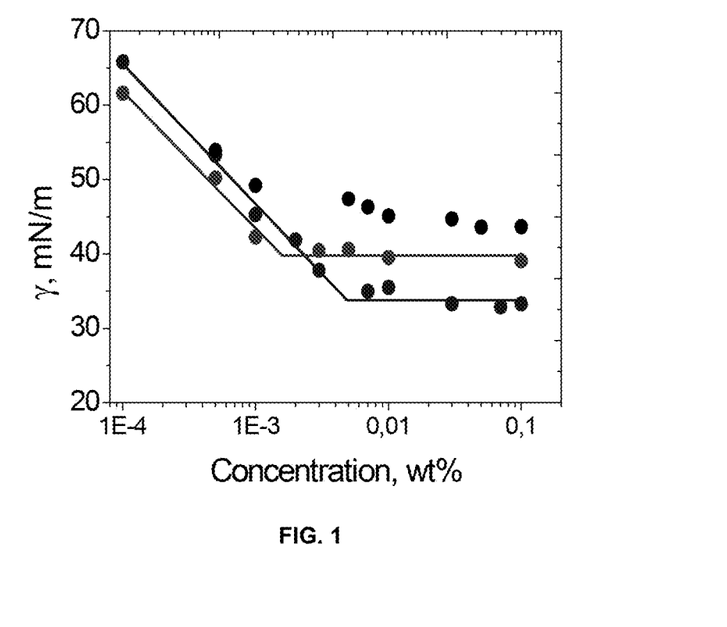
FIG. 1 Shows surface tension values as a function of sample concentration for different compositions of hydrophobic and hydrophilic monomers.

FIG. 1 shows the values of surface tension as a function of the concentration of the sample for different compositions of hydrophobic and hydrophilic monomers.

The molar fraction of ionic monomer in the monomer mixture can be obtained from equation (3):

$$F_{Ionic} = \frac{\text{mmol Hydrophobic monomer}}{\text{mmol Hydrophilic monomer} + \text{mmol Hydrophobic monomer} + \text{mmol Ionic monomer}} \quad (3)$$

Figure 2:
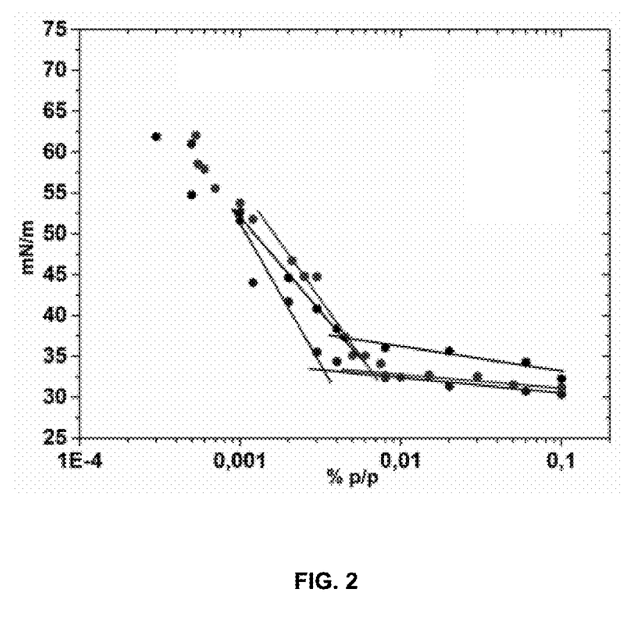
FIG. 2 shows surface tension values as a function of sample concentration for different compositions of hydrophobic and hydrophilic monomers with different compositions of ionic monomer.

FIG. 2 shows the values of surface tension as a function of the concentration of the sample for different compositions of ionic monomers.

In preferred embodiments, the first non-ionic monomer, i.e. the hydrophilic monomer, is selected from di(ethylene glycol) methyl ether methacrylate and poly(ethylene glycol) methyl ether methacrylates and mixtures thereof, the poly(ethylene glycol) methyl ether methacrylates preferably having number-average molecular weights (Mn) of about 480 g/mol, about 500 g/mol or about 950 g/mol and $F_{Hydrophilic}$ is in the range of 0.3-0.5.

Figure 3:
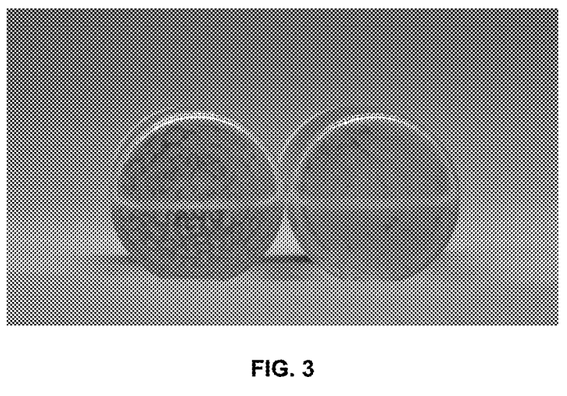
FIG. 3 shows the instability of the surfactant polymer without the incorporation of the ionic monomer in a salt medium between 10,000 ppm and 90,000 ppm at a temperature between 20 and 95° C.
Figure 4:
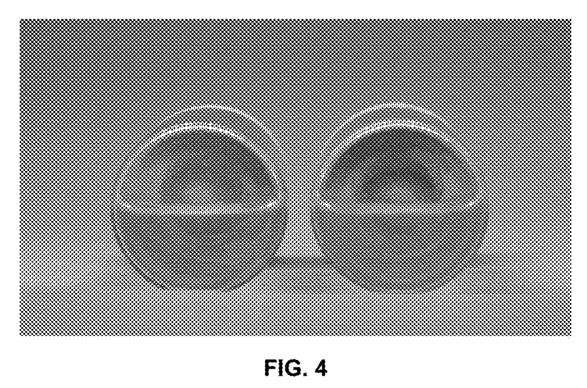
FIG. 4 shows the stability of the surfactant polymer with the incorporation of the ionic monomer in a salt medium between 10,000 ppm and 90,000 ppm at a temperature between 20 and 95° C.

In preferred embodiments, the second non-ionic monomer, i.e. the hydrophobic monomer is selected from dodecyl methacrylate, n-octadecyl methacrylate, butyl methacrylate, t-butyl methacrylate, 2-ethylhexyl methacrylate, 2-(diethylamino) ethyl methacrylate, styrene and mixtures thereof and $F_{Hydrophobic}$ is in the range of 0.4-0.8. In preferred embodiments, the ionic monomer is selected from sodium methacrylate, [2-(methacryloyloxy) ethyl] trimethylammonium chloride, a 3-sulfopropyl methacrylate potassium salt and [2-(methacryloyloxy) ethyl] dimethyl-(3-sulfopropyl) ammonium hydroxide and mixtures thereof and $F_{ionic}$ is in the range of 0.01-0.15. FIGS. 3 and 4 show the polymeric surfactant with and without the ionic monomer and its relevance in saline and thermal stability. The incorporation of the ionic monomer is what allows the versatility to use this surfactant polymer in different saline media and temperatures.

The experimental results obtained for thermal stability, spinning drop and flow in rock media essays show the advantageous effect of a polymeric surfactant provided by the invention.

Surprisingly, it was found that the polymeric surfactant obtained using the monomers combinations disclosed herein, displayed an increased tolerance to highly saline aqueous phases, as well as ultra-low oil/water interfacial tension values compared with surfactants of the prior art.

Figure 5:
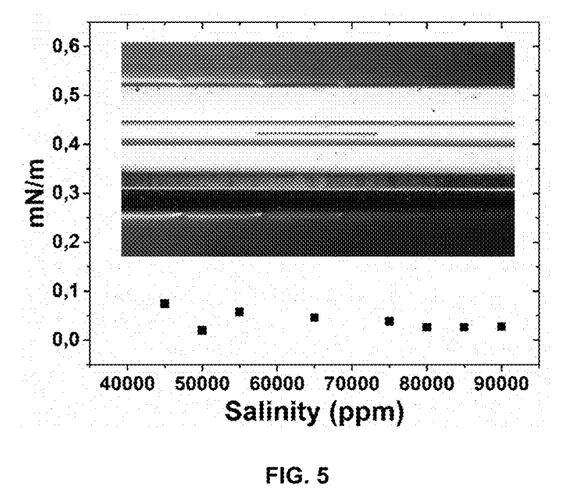
FIG. 5 shows the oil/water interfacial tensions obtained in a system comprising a selected polymeric surfactant provided by the present invention.

The oil/water interfacial tensions at 42° C. obtained when using the selected polymeric surfactant provided by the invention are in the range of $1\times10^{-2}$ mN/m to $1\times10^{-3}$ mN/m for a concentration range between 0 and 100,000 ppm as shown in FIG. 5. Surfactants of the prior art having interfacial tensions of about $1\times10^{-2}$ mN/m, i.e., close to the lower end of the range obtainable with the surfactant provided by the present invention. In addition, these surfactants only reach these values for interfacial tensions in a narrow salinity range. These results show the relevance of polymeric surfactants, since they provide a greater operating range with low interfacial tensions, which is a very important condition in the oil industry.

Figure 6:
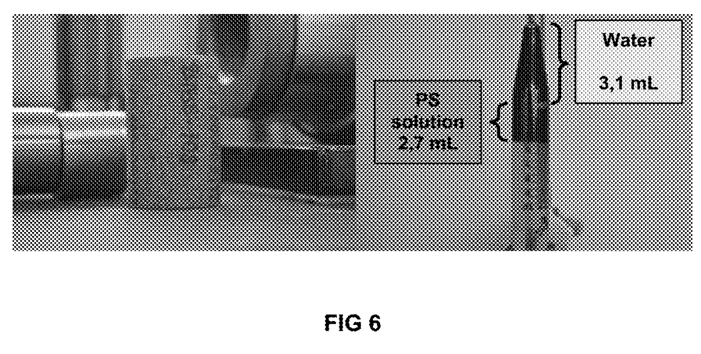
FIG. 6 shows the recovery factors obtained in a system comprising a selected polymeric surfactant provided by the present invention.

The recovery factors using the selected polymeric surfactant provided by the invention are elevated, as shown in FIG. 6. The left-hand side of FIG. 6 shows the Model Rock Plug after having been swept in a core flow experiment using the polymeric surfactant. The right-hand side shows the crude oil volume recovered by the polymeric surfactant in the first sweep with water up to residual oil saturation. For a poral volume of 15 mL, determined by both $N_2$ and water measurements, and a displaced water volume in the trap of 13.0 mL, 3.1 mL of crude oil were dragged by the action of a water flow (crude recovered in Secondary Oil Recovery phase) and 2.7 mL of crude oil were dragged by the action of a water flow comprising the polymeric surfactant, i.e. a 87% increase.

The system comprising the polymeric surfactant provided by the invention is stable in a temperature range from room temperature, i.e. about 20° C., to 95° C. for several weeks.

The invention claimed is:

1. A surfactant comprising a terpolymer of:
a first non-ionic monomer;
a second non-ionic monomer; and
an ionic monomer,
wherein the first non-ionic monomer is a poly(ethylene glycol) methyl ether methacrylate having a number-average molecular weight (Mn) selected from 480 g/mol, 500 g/mol and 950 g/mol and the second non-ionic monomer is a hydrophobic monomer, the molar ratio of first non-ionic monomer to total monomer is between 0.3 and 0.5, the molar ratio of second non-ionic monomer to total monomer is between 0.4 and 0.8 and the molar ratio of ionic monomer to total monomer is between 0.01 and 0.15.

2. The surfactant of claim 1, wherein the second non-ionic monomer is selected from dodecyl methacrylate, n-octadecyl methacrylate, butyl methacrylate, t-butyl methacrylate, 2-ethylhexyl methacrylate, 2-(diethylamino) ethyl methacrylate, styrene.

3. The surfactant of claim 1, wherein the ionic monomer is selected from sodium methacrylate, [2-(methacryloyloxy) ethyl] trimethylammonium chloride, a 3-sulfopropyl methacrylate potassium salt, [2-(methacryloyloxy) ethyl] dimethyl-(3-sulfopropyl) ammonium hydroxide.

* * * * *